(12) United States Patent
Athreya et al.

(10) Patent No.: US 12,481,558 B2
(45) Date of Patent: Nov. 25, 2025

(54) FLEXIBLE RAID PARITY APPLICATION FOR MEMORY MANAGEMENT

(71) Applicant: SK Hynix NAND Product Solutions Corp., Rancho Cordova, CA (US)

(72) Inventors: Arun Athreya, Folsom, CA (US); Yihua Zhang, Folsom, CA (US); Shankar Natarajan, Folsom, CA (US); Sriram Natarajan, Folsom, CA (US); Shivashekar Muralishankar, Folsom, CA (US); Orapin Yoder, Chandler, AZ (US); Parth Donga, Folsom, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 104 days.

(21) Appl. No.: 18/509,686

(22) Filed: Nov. 15, 2023

(65) Prior Publication Data

US 2025/0156273 A1    May 15, 2025

(51) Int. Cl.
*G06F 11/10* (2006.01)
*G06F 3/06* (2006.01)
*G06F 12/02* (2006.01)

(52) U.S. Cl.
CPC ............ *G06F 11/108* (2013.01); *G06F 3/065* (2013.01); *G06F 12/0246* (2013.01)

(58) Field of Classification Search
CPC ..... G06F 3/065; G06F 11/108; G06F 12/0246
See application file for complete search history.

(56) References Cited

U.S. PATENT DOCUMENTS

| | | | |
|---|---|---|---|
| 10,496,484 B2* | 12/2019 | Freikorn | G06F 11/167 |
| 10,635,585 B2* | 4/2020 | Kashyap | G06F 12/0607 |
| 10,936,226 B2* | 3/2021 | Kanno | G06F 3/067 |
| 2014/0013033 A1 | 1/2014 | Sharon et al. | |
| 2017/0228176 A1 | 8/2017 | Kim | |
| 2019/0213075 A1 | 7/2019 | Kim | |
| 2020/0183613 A1 | 6/2020 | Lee | |
| 2020/0334103 A1 | 10/2020 | Miyoshi et al. | |
| 2021/0397347 A1* | 12/2021 | Lin | G06F 3/0608 |
| 2023/0297470 A1* | 9/2023 | Kaynak | G06F 11/1048 714/755 |

\* cited by examiner

*Primary Examiner* — Joseph R Kudirka
(74) *Attorney, Agent, or Firm* — Haley Guiliano LLP

(57) ABSTRACT

A system and related method, the system including control circuitry and memory with a first memory block of a first memory density and a second memory block of a second memory density which is greater than the first memory density. Control circuitry, which is communicatively coupled to the memory, is configured to determine to transfer data from the first memory block to the second memory block, generate parity data based on the data and cause to store the parity data at a parity address corresponding to an available portion of the first memory block. Control circuitry is further to cause to update a look-up table with the parity data address and cause to copy the data from the first memory block to the second memory block.

19 Claims, 6 Drawing Sheets

FLEXIBLE RAID PARITY APPLICATION FOR MEMORY MANAGEMENT

TECHNICAL FIELD

The present disclosure is directed to systems and methods for data management within memory.

SUMMARY

In accordance with the present disclosure, systems and methods are provided for performing memory management of data using flexible RAID parity. The system may include memory having a first memory block of a first memory density and a second memory block of a second memory density which is greater than the first memory density. The system and methods disclosed herein enable flexible RAID parity, which is generated based on data which is to be transferred from the first memory block to the second memory block and stored within the first memory block for improved accessibility of parity data. The system may also include control circuitry, which is configured to determine whether to transfer data from the first memory block to the second memory block. The control circuitry then generates parity data corresponding to the data based on the data, which may be used to detect or correct an incorrect portion of the data to be transferred. The control circuitry is further configured to cause the parity data to be stored at an available parity data address within the first memory block to leverage the low read/write times of the first memory block, which is of a lower memory density than the second memory density. This improves the overall reliability and bandwidth of data transfer completed by the control circuitry of the system (e.g., a solid-state drive (SSD) device) during the process of performing memory management of data.

In some embodiments, the system (e.g., a storage device) is provided with a memory and control circuitry that are communicatively coupled to each other. In some embodiments, the control circuitry receives requests indicating data to be transferred from the first memory block to the second memory block. In some embodiments, the request received by the control circuitry includes a source address which corresponds to data stored in the first memory block and a destination memory address which corresponds to an address of the second memory block to which to store the data.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

DETAILED DESCRIPTION

Figure 1:
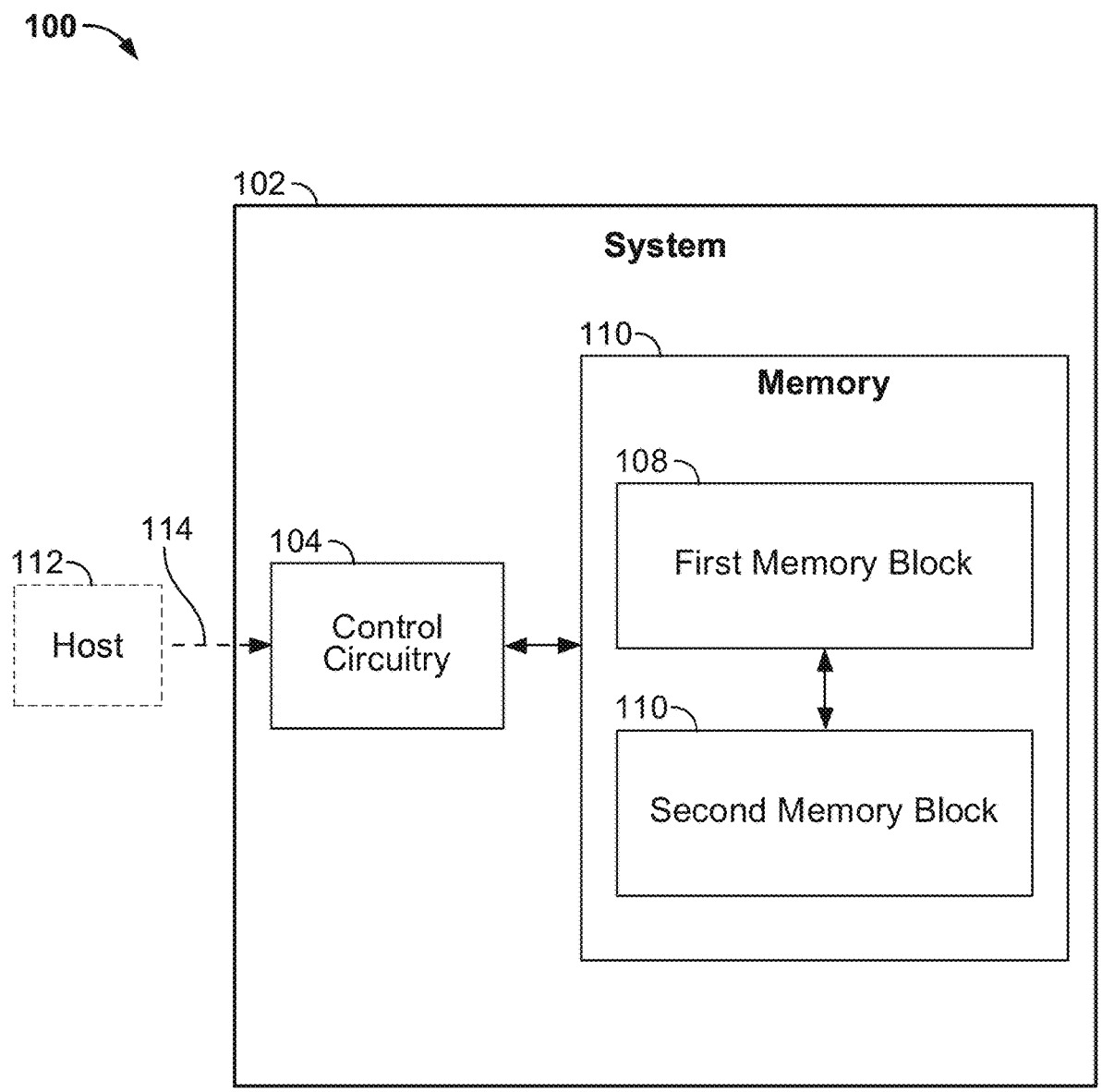
FIG. 1 shows an illustrative diagram of a system with control circuitry and memory with a first memory block and a second memory block, in accordance with some embodiments of the present disclosure.

In accordance with the present disclosure, systems and methods are provided for performing memory management of data using flexible RAID parity in a system (e.g., an SSD device). An SSD device may determine whether to transfer data from a first memory block of a first memory density to the second memory block of a second memory density that is greater than the first memory density and then transfer the data by first generating parity data corresponding to the data, based on the data, to ensure reliable data transfer. However, if control circuitry stores the parity data corresponding to the data in the second memory block, less memory within the second memory block is available for data to be stored within the more dense memory block (e.g., the second memory block).

The control circuitry is configured to generate parity data to ensure reliable data transfer from the first memory block to the second memory block. The control circuitry determines whether to transfer the data from the first memory block to the second memory block. Once the control circuitry determines to transfer the data from the first memory block to the second memory block, the control circuitry generates parity data corresponding to the data, based on the data. In some embodiments, the parity data may be any suitable form of parity data to improve data transfer reliability when control circuitry transfers data from the first memory block to the second memory block. The parity data may be used by control circuitry to detect or correct at least one incorrect portion of the data transferred from the first memory block to the second memory block. In some embodiments, each of the incorrect portions may be of at least one bit in length. The control circuitry then causes the parity data to be stored at a parity data address corresponding to an available portion of the first memory block. In some embodiments, the control circuitry may cause the parity data to be stored at a parity data address which corresponds to an available portion of any memory block of memory which is of a memory density that is no greater than the first memory density. Control circuitry then updates a look-up table with the parity data address to determine at which parity data address parity data is stored within the first memory block to use the parity data for detection or correction of at least one incorrect portion of the data after the transfer of the data. In some embodiments, the look-up table is stored within memory or data structures maintained and updated by control circuitry. Lastly, the control circuitry is to cause the data to be copied from the first memory block to the second memory block. Once the look-up table has been updated with the parity data address, control circuitry may transfer data from the first memory block to the second memory block. The disclosed data management using flexible RAID parity within the system herein will ensure that the control circuitry is configured to perform the transfer of data from a less-dense memory block (e.g., first memory block) to a more-dense memory block (e.g., second memory block) while maintaining corresponding parity data within the less-dense memory block (e.g., first memory block) for the detection and correction of any incorrect portion of the data transferred. This process improves the reliability and bandwidth of data transfer completed by the control circuitry during the process of data management of the system (e.g., a storage device).

In some embodiments, the memory of the system disclosed herein may contain any of the following memory densities: single-level cells (SLCs), multi-level cells (MLCs), triple-level cells (TLCs), quad-level cells (QLCs), penta-level cells (PLCs), and any suitable memory density that is greater than five bits per memory cell. In some embodiments, the memory includes at least the first memory block of a first memory density and the second memory block of a second memory density which is greater than the first memory density.

For purposes of brevity and clarity, the features of the disclosure described herein are in the context of a system (e.g., an SSD device) having control circuitry and memory. However, the principles of the present disclosure may be applied to any other suitable context in which data management between at least two memory blocks of different memory densities is performed using parity data. The system may include control circuitry and memory, which includes the first memory block and the second memory block, and the control circuitry and memory are communicatively coupled to each other by network buses or interfaces. In some embodiments, the control circuitry receives requests to transfer data from the first memory block to the second memory block. In some embodiments, the request is sent from a host to the system via a network bus or interface.

In particular, the present disclosure provides systems and methods that generate parity data based on data that is to be transferred from the first memory block to the second memory block of memory which uses flexible RAID parity. The systems and methods leverage the use of the less-dense first memory block to quickly access parity data when required to detect or correct at least one incorrect portion of the data transferred. This improves the overall reliability and bandwidth of data transfer completed within the system while the control circuitry performs memory management of data.

In some embodiments, a processor of the control circuitry may be a highly parallelized processor capable of handling high bandwidths of incoming data quickly (e.g., by starting simultaneous processing of requests or instructions before completion of previously received requests or instructions).

In some embodiments, the system and methods of the present disclosure may refer to a storage device system (e.g., an SSD storage system), which includes a storage device such as a solid-state drive device, which is communicatively coupled to the control circuitry by a network bus or interface.

An SSD is a data storage device that uses integrated circuit assemblies as memory to store data persistently. SSDs have no moving mechanical components, and this feature distinguishes SSDs from traditional electromechanical magnetic disks, such as hard disk drives (HDDs) or floppy disks, which contain spinning disks and movable read/write heads. Compared to electromechanical disks, SSDs are typically more resistant to physical shock, run silently, have lower access time, and less latency.

Many types of SSDs use NAND-based flash memory which retains data without power and includes a type of non-volatile storage technology. Quality of Service (QOS) of an SSD may be related to the predictability of low latency and consistency of high input/output operations per second (IOPS) while servicing read/write input/output (I/O) workloads. This means that the latency or the I/O command completion time needs to be within a specified range without having unexpected outliers. Throughput or I/O rate may also need to be tightly regulated without causing sudden drops in performance level.

The subject matter of this disclosure may be better understood by reference to FIGS. 1-5.

FIG. 1 shows an illustrative diagram of a system 102 with control circuitry 104 and memory 106 with a first memory block 108 and a second memory block 110, in accordance with some embodiments of the present disclosure. In some embodiments, system 102 may be a storage device such as a solid-state storage device (e.g., an SSD device). In some embodiments, control circuitry 104 may include a processor or any suitable processing unit. In some embodiments, memory 106 may be non-volatile memory. It will be understood that the embodiments of the present disclosure are not limited to SSDs. For example, in some embodiments, system 102 may include a hard disk drive (HDD) device in addition to or in place of an SSD.

In some embodiments, the control circuitry 104 is configured to receive requests (e.g., request 114) from host 112, where each request 114 includes a source memory address of the first memory block 108. The request 114 indicates to the control circuitry 104 that the corresponding data stored at the source memory address of the first memory block 108 is to be transferred to an available portion of the second memory block 110. In some embodiments, the available portion of the second memory block 110 may be an unused portion of memory or a portion of memory that corresponds to invalid or stale data that is no longer needed by the control circuitry 104. In some embodiments, request 114 is transmitted on a network bus or interface to control circuitry 104. In some embodiments, request 114 is transmitted from an external source (e.g., a host 112 that is communicatively coupled to system 102). The control circuitry 104 may receive requests (e.g., request 114) from both internal and external sources of the system 102. In some embodiments, system 102 includes volatile memory, which is configured to temporarily store any outstanding requests (e.g., request 114) that are to be processed by control circuitry 104.

Additionally, system 102 includes memory 106. In some embodiments, memory 106 includes any one or more of a non-volatile memory, such as Phase Change Memory (PCM), a PCM and switch (PCMS), a Ferroelectric Random Access Memory (FeRAM), or a Ferroelectric Transistor Random Access Memory (FeTRAM), a Memristor, a Spin-Transfer Torque Random Access Memory (STT-RAM), and a Magnetoresistive Random Access Memory (MRAM), any other suitable memory, or any combination thereof. In some embodiments, system memory 106 includes a first memory block 108 of a first memory density and a second memory block 110 of a second memory block which is greater than the first memory density. The first memory density and the second memory density may be any one of (a) single-level cell (SLC) memory density, (b) multi-level cell (MLC) memory density, (c) tri-level cell (TLC) memory density, (d) quad-level cell (QLC) memory density, (e) penta-level cell (PLC) memory density, or (f) a memory density of greater than 5 bits per memory cell, wherein the second memory density is greater than the first memory density. In some embodiments, control circuitry 104 is communicatively coupled to memory 106 to store and access data in memory blocks (e.g., first memory block 108 and second memory block 110). In some embodiments, a data bus interface is used to transport write/read requests or data associated with memory management. In some embodiments, memory 106 may include more than two memory blocks, such as a third memory block of a third memory density that is greater than or equal to the second memory density. The data bus between memory 106 and control circuitry 104 provides a network bus for accessing or writing data to memory 106 (e.g., any memory block of memory 106).

In some embodiments, system 102 also includes volatile memory, which may include any one or more volatile memory, such as Static Random Access Memory (SRAM). In some embodiments, volatile memory is configured to temporarily store data (e.g., request 114 data) during execution of operations by control circuitry 104. In some embodiments, control circuitry 104 is communicatively coupled to volatile memory to store and access data corresponding to the volatile memory. In some embodiments, a data bus interface is used to transport request 114 data from volatile memory to control circuitry 104. In some embodiments, volatile memory is communicatively coupled to memory 106, the volatile memory configured to function as a cache or temporary memory storage for memory 106. In some embodiments, a data bus interface between memory 106 and volatile memory provides a network bus for accessing or writing data to or from memory 106 (e.g., first memory block 108 and second memory block 110).

In some embodiments, the processor or processing unit of control circuitry 104 may include a hardware processor, a software processor (e.g., a processor emulated using a virtual machine), or any combination thereof. The processor, also referred to herein as control circuitry 104, may include any suitable software, hardware, or both for controlling memory 106 and control circuitry 104. In some embodiments, system 102 may further include a multi-core processor. Memory 106 may also include hardware elements for non-transitory storage of instructions, commands, or requests.

The control circuitry 104 is configured to perform memory management using flexible RAID parity within memory 106 by generating parity data to ensure reliable data transfer from the first memory block 108 to the second memory block 110. Initially, control circuitry 104 determines whether to transfer the data from the first memory block 108 to the second memory block 110. In some embodiments, control circuitry 104 may receive a request 114 from host 112 which indicates to system 102 that data transfer is to be performed. Once the control circuitry 104 determines to transfer the data from the first memory block 108 to the second memory block 110, the control circuitry 104 generates parity data corresponding to the data, based on the data. In some embodiments, the parity data may be any suitable form of parity data to improve data transfer reliability when control circuitry 104 transfers data from the first memory block 108 to the second memory block 110. The parity data may be used by control circuitry 104 to detect or correct at least one incorrect portion of the data transferred from the first memory block 108 to the second memory block 110. In some embodiments, the incorrect portions may be at least one bit in length. The control circuitry is then to cause the parity data to be stored at a parity data address corresponding to an available portion of the first memory block 108. In some embodiments, the control circuitry may cause the parity data to be stored at a parity data address which corresponds to an available portion of any memory block of memory which is of a memory density that is no greater than the first memory density. Control circuitry 104 then updates a look-up table with the parity data address to determine at which parity data address parity data is stored within the first memory block 108 to use the parity data for detection or correction of at least one incorrect portion of the data after the transfer of the data. In some embodiments, the look-up table is stored within memory 106 or data structures are maintained and updated by control circuitry 104. Lastly, the control circuitry 104 is to cause the data to be copied from the first memory block 108 to the second memory block 110. Once the look-up table has been updated with the parity data address, control circuitry 104 may transfer data from the first memory block to the second memory block. The disclosed data management using flexible RAID parity within system 102 herein will ensure that the control circuitry 104 is configured to perform the transfer of data from a less-dense memory block (e.g., first memory block 108) to a more-dense memory block (e.g., second memory block 110) while maintaining corresponding parity data within the less-dense memory block (e.g., first memory block 108) for the detection and correction of any incorrect portion of the data transferred. This process improves the reliability and bandwidth of data transfer completed by the control circuitry 104 during the process of data management of the system 102 (e.g., a storage device).

In some embodiments, system 102 may be a storage device (for example, SSD devices) which may include one or more packages of memory dies (e.g., memory 106), where each die includes storage cells. In some embodiments, the storage cells are organized into pages or super pages, such that pages and super pages are organized into blocks, such as first memory block 108 and second memory block 110. Each storage cell can store one or more bits of information.

For purposes of clarity and brevity, and not by way of limitation, the present disclosure is provided in the context of performing memory management of data using flexible RAID parity with improved use of high-dense memory blocks (e.g., the second memory block 110) to include more data per page while the parity data corresponding to the data is quickly accessible in the sparsely-dense memory block (e.g., the first memory block 108). By storing the parity data corresponding to the data to be transferred from the first memory block 108 to the second memory block 110, system 102 has an improved bandwidth for detecting or correcting an incorrect portion of the data by using the parity data corresponding to the data. The process of performing memory management of data using flexible RAID parity with improved use of high-dense memory blocks may be configured by any suitable software, hardware, or both for implementing such features and functionalities. Performing memory management of data using flexible RAID parity, as disclosed, may be at least partially implemented in, for example, system 102 (e.g., as part of control circuitry 104, or any other suitable device). For example, for a solid-state storage device (e.g., system 102), performing memory management of data using flexible RAID parity with improved use of high-dense memory blocks may be implemented in control circuitry 104.

Figure 2:
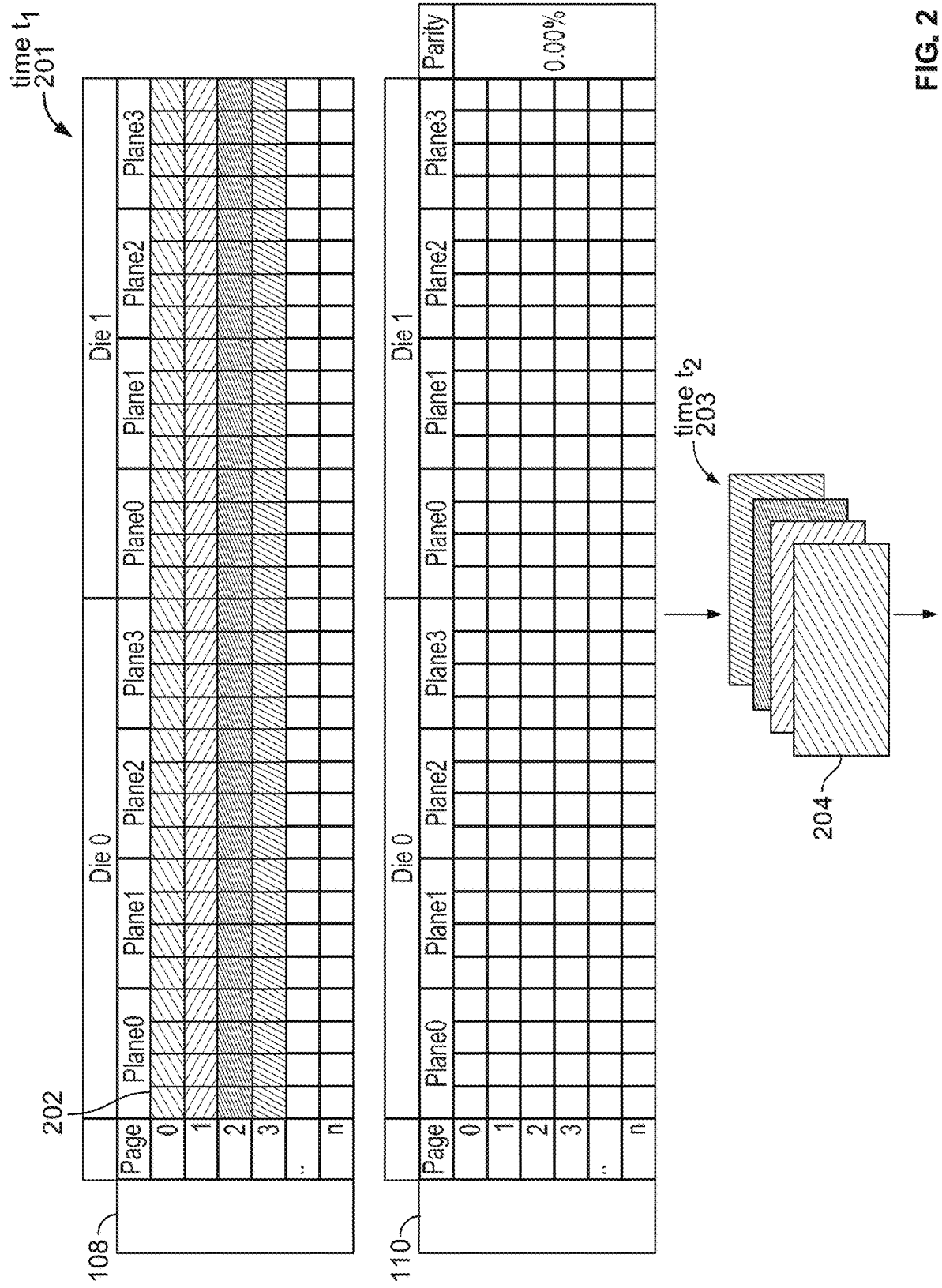
FIG. 2 shows an illustrative diagram that shows a first memory block and a second memory block of memory with flexible RAID parity, in accordance with some embodiments of the present disclosure.
Figure 2:
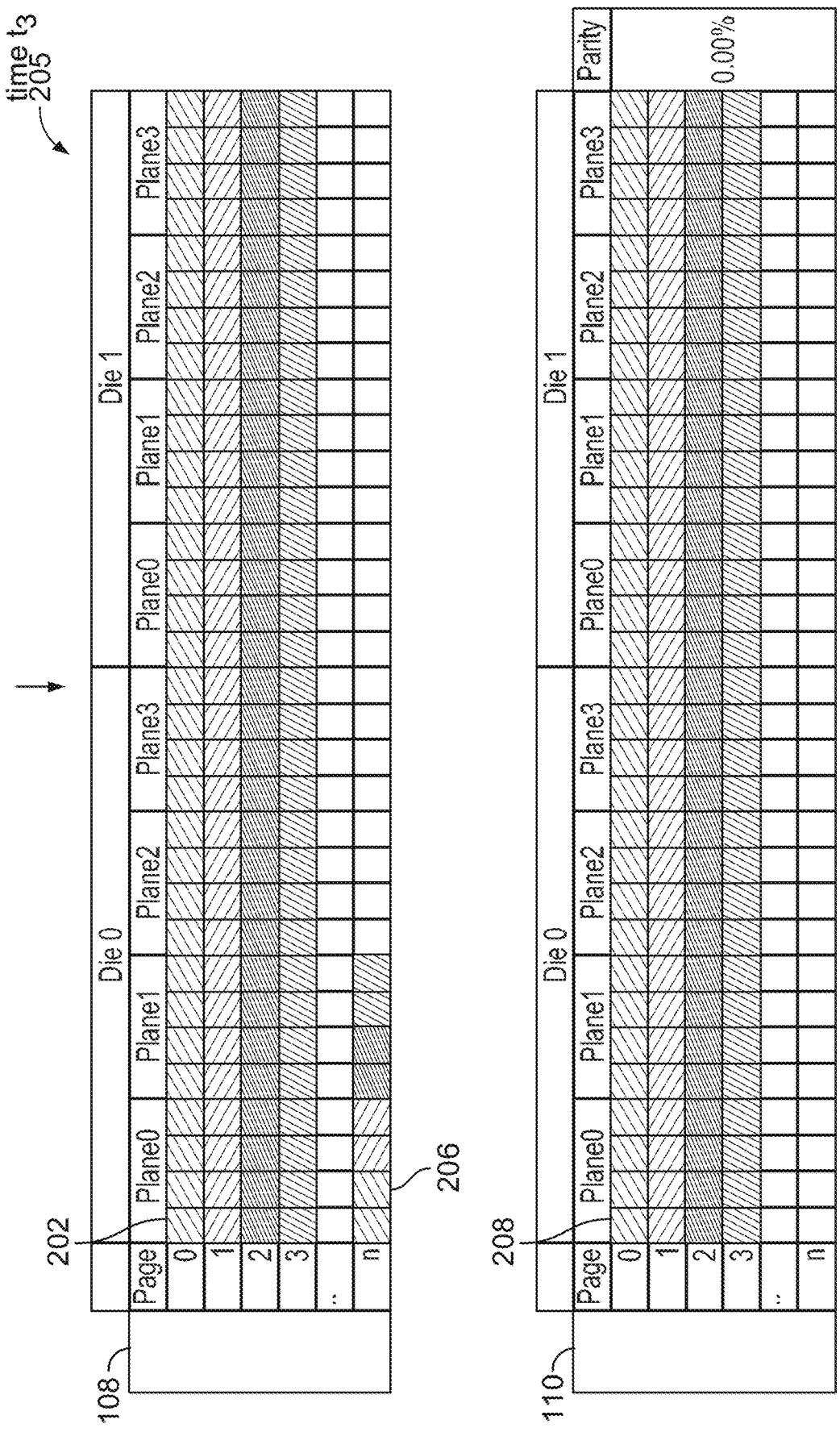

FIG. 2 shows an illustrative diagram that shows a first memory block 108 and a second memory block 110 of memory with flexible RAID parity, in accordance with some embodiments of the present disclosure.

At time $t_1$ 201, the first memory block 108, which is of a first memory density, includes data 202 stored across 4 pages (pages 0-3). In some embodiments, the first memory density may be any one of (a) single-level cell (SLC) memory density, (b) multi-level cell (MLC) memory density, (c) tri-level cell (TLC) memory density, (d) quad-level cell (QLC) memory density, (e) penta-level cell (PLC) memory density, or (f) a memory density of greater than 5 bits per memory cell. There is also an available second memory block 110, of a second memory density which is greater than the first memory density. In some embodiments, the second memory block 110 includes sufficient available memory to store the data 202. In some embodiments, available memory may be defined as unused/empty memory or memory addresses that currently store invalid data that may be overwritten.

At time $t_2$ 203, control circuitry receives requests (e.g., request 204), which indicate that data 202 is to be transferred from the first memory block 108 to the second memory block 110. As shown in FIG. 2, there is a request 204 to transfer data for each page of data 202. In some embodiments, data 202 may be a super page of data and each page (pages 0-3) stores a portion of the super page of data. In such embodiments, the control circuitry may receive one request to transfer the super page of data (e.g., data 202) from the first memory block 108 to the second memory block 110.

At time $t_3$ 205, control circuitry generates parity data 206, which includes respective parity data for each respective page of data 202. The data 202 is transferred to the second memory block 110, represented as copied data 208. The copied data 208 is stored in the more dense second memory block 110 without the corresponding parity data 206 to store more data per page within the second memory block 110 than the data per page within the first memory block. The control circuitry stores the parity data 206 in the first memory block 108, to leverage the fast read/write time of the less-dense memory block (e.g., first memory block 108) in case error correction is to be performed on copied data 208 using the parity data 206. In some embodiments, the control circuitry stores the parity data 206 to a third memory block (not pictured) of a third memory density which is less than the second memory density.

After time $t_3$ 205, the data 202 and parity data 206 may be marked as invalid and therefore may be removed by garbage collection processes or overwritten by newly received data or newly generated parity data which corresponds to the newly received data. Although first memory block 108 and second memory block 110 each include two memory dies and each memory die includes 4 planes, each of the first memory block 108 and the second memory block 110 may include any suitable number of dies and each respective die may include any suitable number of planes.

Figure 3:
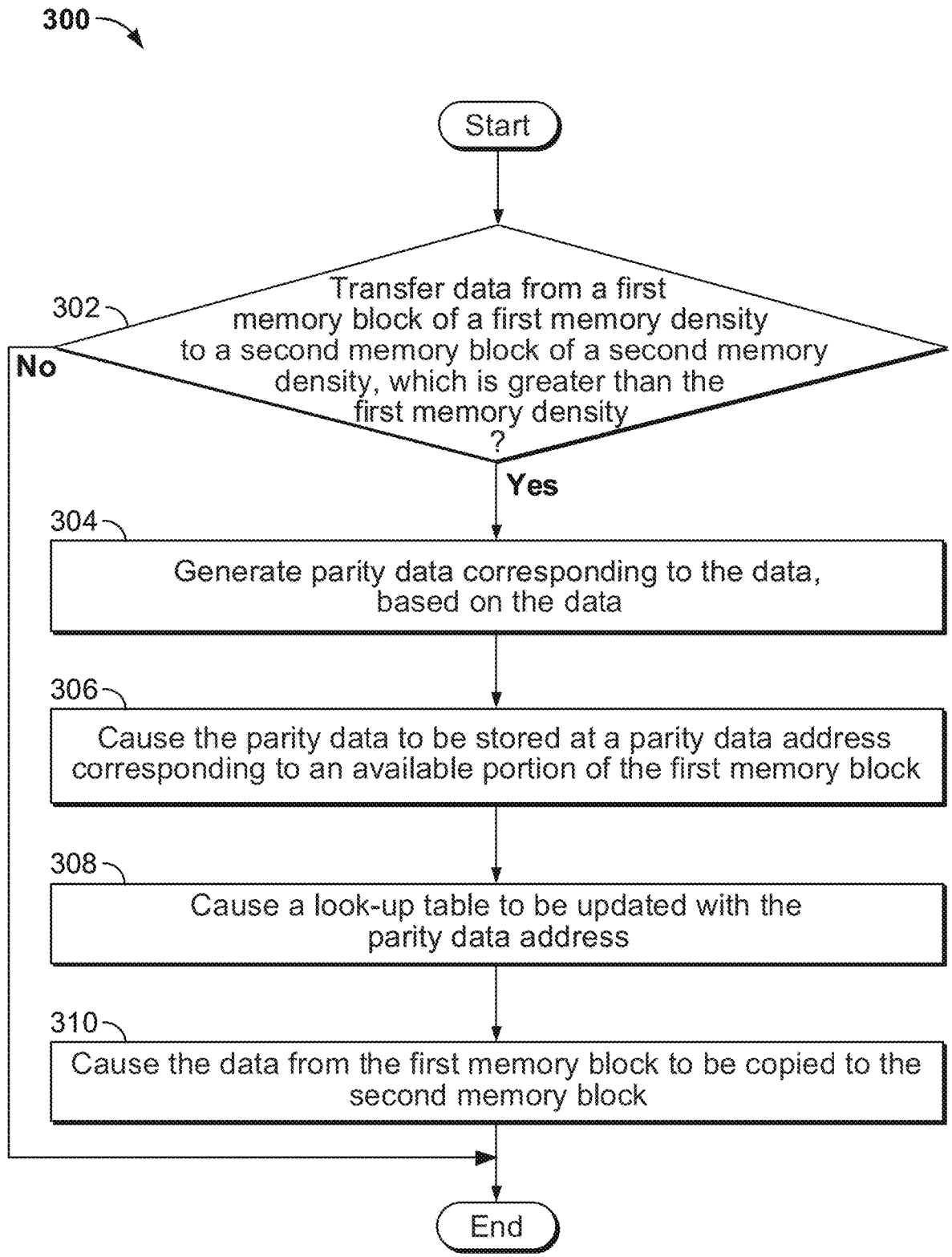
FIG. 3 shows a flowchart of illustrative steps for performing memory management using flexible RAID parity, in accordance with some embodiments of the present disclosure.

FIG. 3 shows a flowchart of illustrative steps of process 300 for performing memory management using flexible RAID parity, in accordance with some embodiments of the present disclosure. In some embodiments, the referenced system, control circuitry, memory, first memory block, second memory block, host and request may be implemented as system 102, control circuitry 104, memory 106, first memory block 108, second memory block 110, host 112 and request 114, respectively. In some embodiments, the process 300 can be modified by, for example, having steps rearranged, changed, added, and/or removed.

At step 302, control circuitry determines whether to transfer data from a first memory block of a first memory density to a second memory block of a second memory density which is greater than the first memory density. In some embodiments, control circuitry receives a request from a host, which is communicatively coupled to the system via a data bus interface or network interface. The request may include a source memory address such that control circuitry transfers data stored at the source memory address to an available address of the second memory block. In some embodiments, the system will transfer data from a memory address of a first memory block (e.g., the source memory address) of a first memory density to a memory address of a second memory block of a second memory density which is greater than the first memory density. In such embodiments, each data cell of the second memory block stores more bits of data than each data cell of the first memory block. If control circuitry determines that there is no transfer of data between the first memory block and the second memory block and that the second memory density is not greater than the first memory density, process 300 terminates. When control circuitry determines to transfer data from the first memory block to the second memory block and that the second memory density is greater than the first memory density, control circuitry is to generate parity data, as shown at step 304.

At step 304, control circuitry generates parity data corresponding to the data, based on the data. In some embodiments, the parity data may be any suitable form of parity data, including but not limited to error-correction codes such as low-density parity codes (LDPC). The parity data is generated to improve data transfer reliability when control circuitry transfers data from the first memory block to the second memory block. The parity data may be used by control circuitry to detect or correct at least one incorrect portion of the data transferred from the first memory block to the second memory block. In some embodiments, the incorrect portions may be at least one bit in length.

At step 306, the control circuitry is to cause the parity data to be stored at a parity data address corresponding to an available portion of the first memory block. In some embodiments, the control circuitry may cause the parity data to be stored at a parity data address which corresponds to an available portion of any memory block of memory which is of a memory density that is no greater than the first memory density. This ensures, that the parity data which corresponds to the data is stored within a sparsely-dense memory block, reducing the read-time and write-time to access the parity data corresponding to the data. Therefore, when parity data for data transferred from the first memory block to the second memory block is needed to detect or correct at least one incorrect portion of data, the control circuitry may quickly access the parity data to execute error-correction of the data by using the parity data.

At step 308, control circuitry is to cause a look-up table to be updated with the parity data address. The look-up table is used by control circuitry to determine at which parity data address the parity data is stored within the first memory block to use relevant parity data for the detection or correction of at least one incorrect portion of the data after the transfer of data.

At step 310, control circuitry is to cause the data to be copied from the first memory block to the second memory block. Once the look-up table has been updated with the parity data address, control circuitry may transfer data from the first memory block to the second memory block. In some embodiments, the data is transferred from the first memory block to the second memory block via an interface bus which communicatively couples the first memory block to the second memory block.

Figure 4:
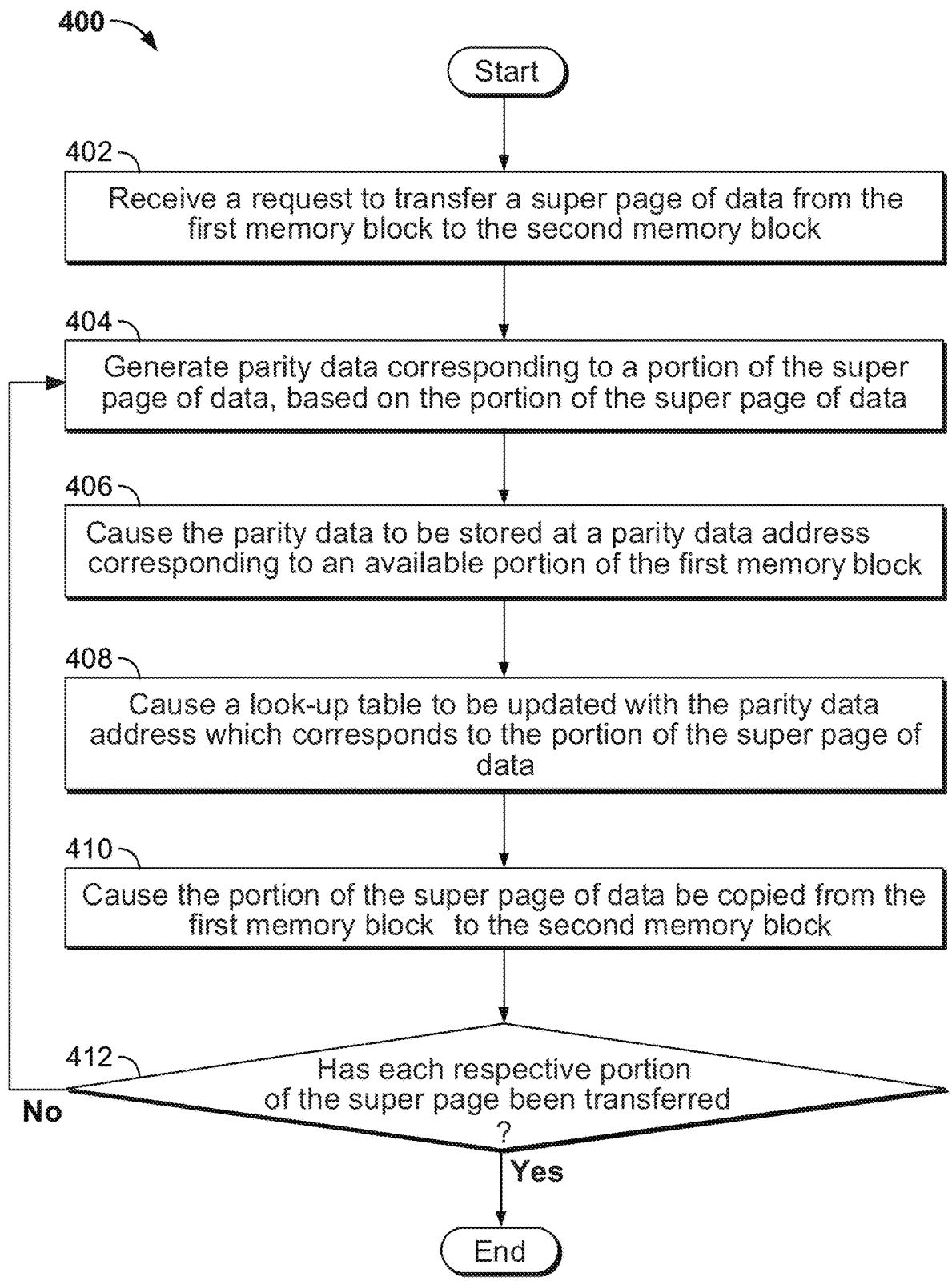
FIG. 4 shows a flowchart of illustrative steps for performing memory management for a super page of data using flexible RAID parity, in accordance with some embodiments of the present disclosure.

FIG. 4 shows a flowchart of illustrative steps of process 400 for performing memory management for a super page of data using flexible RAID parity, in accordance with some embodiments of the present disclosure. In some embodiments, the referenced system, control circuitry, memory, first memory block, second memory block, host and write request may be implemented as system 102, control circuitry 104, memory 106, first memory block 108, second memory block 110, host 112 and write request 114, respectively. In some embodiments, the process 400 can be modified by, for example, having steps rearranged, changed, added, and/or removed.

At step 402, control circuitry receives a request to transfer a super page of data from the first memory block to the second memory block. Similarly as to step 302 of process 300, when control circuitry receives a request to transfer a super page of data, the control circuitry determines to transfer a super page of data from the first memory block of a first memory density to the second memory block of a second memory density which is greater than the first memory density. In some embodiments, control circuitry receives the request from a host, which is communicatively coupled to the system via a data bus interface or network interface. In some embodiments, the request includes a source memory address and a destination memory address such that control circuitry transfers at least one portion of the super page of data stored at the source memory address to the destination memory address. In some embodiments, the system will transfer at least one portion of the super page of data from a memory address of a first memory block (e.g., the source memory address) of a first memory density to a memory address of a second memory block (e.g., the destination memory address) of a second memory density which is greater than the first memory density. In some embodiments, the portion of the super page of data may be defined by the size of the page of the second memory block of the second memory density which is greater than the first memory density, such that the page memory size of the second memory block is larger than the page size of the first memory block. When control circuitry receives a request to transfer a super page of data from the first memory block to the second memory block, control circuitry generates parity data corresponding to a portion of the super page of data, based on the portion of the super page of data, as shown at step 404.

At step 404, control circuitry generates parity data corresponding to the portion of the super page of the data, based on the portion of the super page of the data. In some embodiments, the portion of the super page of data corresponds to a length of a page of the second memory block. In some embodiments, the parity data may be any suitable form of parity data, including but not limited to error-correction codes and low-density parity codes (LDPC). The parity data is generated to improve data transfer reliability when control circuitry transfers the portion of the super page of data from the first memory block to the second memory block. The parity data may be used by control circuitry to detect or correct an incorrect portion of the portion of the super page of data transferred from the first memory block to the second memory block. In some embodiments, the incorrect portion may be at least one bit in length.

At step 406, the control circuitry is to cause the parity data to be stored at a parity data address corresponding to an available portion of the first memory block. In some embodiments, the control circuitry may cause the parity data to be stored at a parity data address which corresponds to an available portion of any memory block of memory which is of a memory density that is no greater than the first memory density. This ensures, that the parity data which corresponds to the data is stored within a sparsely-dense memory block, reducing the read-time and write-time to access the parity data corresponding to the portion of the super page of data. Therefore, when parity data corresponding to the portion of the super page of data transferred from the first memory block to the second memory block is needed to detect or correct an incorrect portion of the portion of the super page of data, control circuitry may quickly access the parity data to execute error-correction of the portion of the super page of data by using the parity data.

At step 408, control circuitry is to cause a look-up table to be updated with the parity data address. The look-up table is used by control circuitry to determine at which parity data address the parity data is stored within the first memory block to use relevant parity data for the detection or correction of the incorrect portion of the portion of the super page of data after the transfer of data the portion of the super page of data.

At step 410, control circuitry is to cause the portion of the super page of data to be copied from the first memory block to the second memory block. Once the look-up table has been updated with the parity data address, the control circuitry may transfer the portion of the super page of data from the first memory block to the second memory block. In some embodiments, the portion of the super page of data is transferred from the first memory block to the second memory block via an interface bus which communicatively couples the first memory block to the second memory block.

At step 412, control circuitry determines whether each respective portion of the super page of data has been transferred from the first memory block to the second memory block. When the control circuitry determines that each respective portion of the super page of data has not been transferred from the first memory block to the second memory block, the control circuitry generates parity data corresponding to another portion of the super page of data, based on the other portion of the super page of data, as shown at step 404. When control circuitry determines that each respective portion of the super page of data has been transferred from the first memory block to the second memory block, process 400 terminates.

Figure 5:
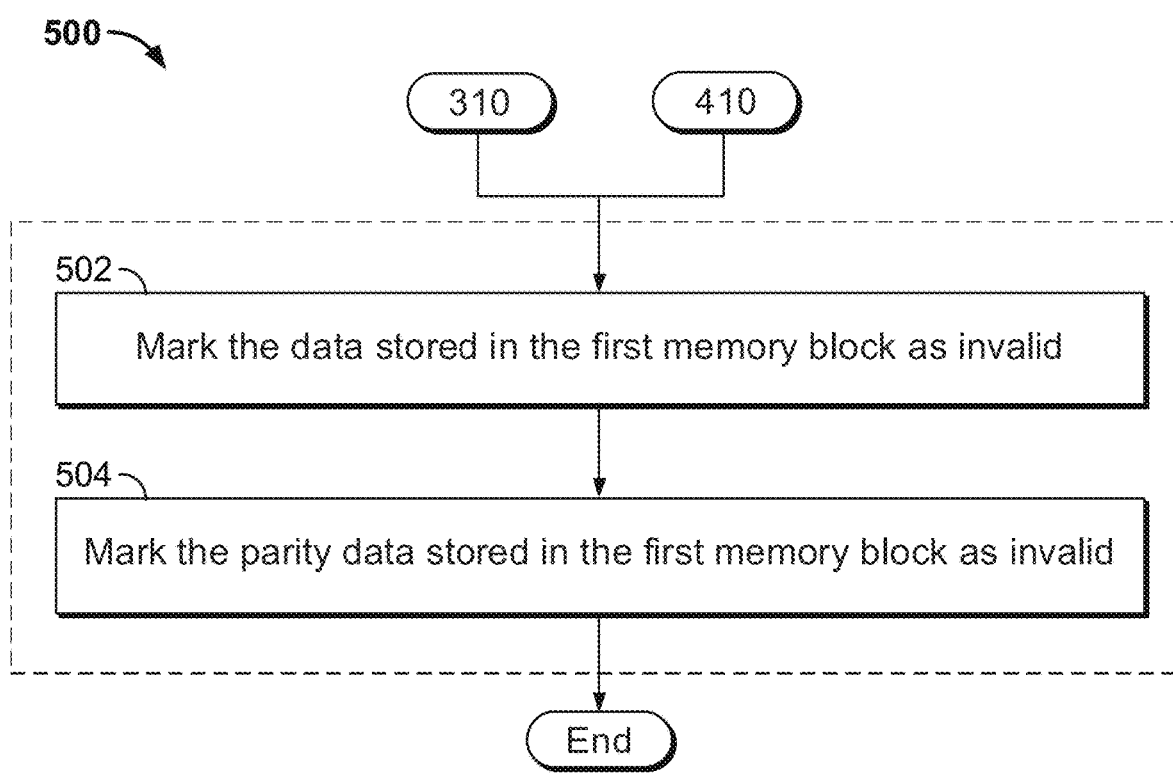
FIG. 5 shows a flowchart of illustrative steps of a sub-process for marking data and parity data as invalid, in accordance with some embodiments of the present disclosure.

FIG. 5 shows a flowchart of illustrative steps of a subprocess 500 for marking data and parity data as invalid, in accordance with some embodiments of the present disclosure. In some embodiments, the referenced system, control circuitry, memory, first memory block, second memory block, host and write request may be implemented as system 102, control circuitry 104, memory 106, first memory block 108, second memory block 110, host 112 and write request 114, respectively. In some embodiments, the subprocess 500 can be modified by, for example, having steps rearranged, changed, added, and/or removed.

At step 502, control circuitry marks the data stored in the first memory block as invalid. The data stored in the first memory block is marked as invalid once control circuitry causes to copy the data from the first memory block to be copied to the second memory block, as shown at step 310. In some embodiments, control circuitry marks the data stored in the first memory block as invalid once control circuitry causes the portion of the super page of data from the first memory block to be copied to the second memory block, as shown at step 410. In some embodiments, once the data has been copied from the first memory block to the second memory block and there is no need to correct or retransmit at least one portion of the data from the first memory block to the second memory block, control circuitry marks the data stored in the first memory block as invalid. In some embodiments, the parity data is used to identify or correct at least one incorrect portion of the data transferred from the first memory block to the second memory block. In some embodiments, control circuitry marks the data stored in the first memory block as invalid for garbage collection of the system to identify invalid data to be cleared. In some embodiments, control circuitry may mark the data stored in the first memory block as invalid by setting an invalid bit that corresponds to the address at which the data is stored in the first memory block or may mark the data stored in the first memory block by any other suitable manner (e.g., an invalid data look-up table). In some embodiments, addresses with data that has been marked as invalid may be reused to store newly received data by overwriting invalid data.

At step 504, control circuitry marks the parity data stored in the first memory block (e.g., at the parity data address) as invalid. In some embodiments, control circuitry marks the parity data stored in the first memory block as invalid by setting an invalid bit that corresponds to the parity data address at which the parity data is stored. In some embodiments, once the data stored in the first memory is marked as invalid, the parity data corresponding to the transferred data is no longer needed and therefore is marked as invalid as well. In some embodiments, parity data at the parity data address which has been marked as invalid may be overwritten by newly generated parity data by control circuitry. In some embodiments, invalid parity data may be cleared using garbage collection processes performed by control circuitry.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A method comprising:
   determining, by control circuitry, to transfer data from a first memory block to a second memory block; and
   based on the first memory block being of a first memory density and the second memory block being of a second memory density which is greater than the first memory density:
      generating, by the control circuitry, parity data based on the data,
      causing to be stored, by the control circuitry, the parity data at a parity data address corresponding to an available portion of the first memory block,
      causing to be updated, by the control circuitry, a look-up table with the parity data address, and
      causing to be copied, by the control circuitry, the data from the first memory block to the second memory block without the parity data.

2. The method of claim 1, wherein determining to transfer data from the first memory block to the second memory block comprises receiving a request from a host device to transfer data from the first memory block to the second memory block.

3. The method of claim 1, further comprising:
   causing the parity data to be stored at a parity data address corresponding to an available portion of a third memory block of a third memory density which is less than the second memory density.

4. The method of claim 1, wherein each of the first memory density and the second memory density is any one of: single-level cell (SLC) memory density, multi-level cell (MLC) memory density, tri-level cell (TLC) memory density, quad-level cell (QLC) memory density, penta-level cell (PLC) memory density, or a memory density of greater than 5 bits per memory cell.

5. The method of claim 1, further comprising:
   in response to causing the data to be copied from the first memory block to the second memory block:
      marking the data stored in the first memory block as invalid; and
      marking the parity data stored in the first memory block as invalid.

6. The method of claim 1, wherein storing the parity data at a parity data address corresponding to available portion of the first memory block comprises storing the parity data at a parity data address which corresponds to: (a) an unallocated portion of memory or (b) invalid data.

7. The method of claim 1, wherein determining to transfer data from the first memory block to the second memory block comprises receiving a request to transfer a page of data from the first memory block to the second memory block.

8. The method of claim 1, wherein determining to transfer data from the first memory block to the second memory block comprises receiving a request to transfer a super page of data from the first memory block to the second memory block.

9. The method of claim 8, wherein in response to receiving a request to transfer the super page of data from the first memory block to the second memory block:
(a) generating parity data corresponding to a portion of the super page of data, based on the portion of the super page of data;
(b) causing to be stored the parity data at a parity data address corresponding to an available portion of the first memory block;
(c) causing to be updated a look-up table with the parity data address which corresponds to the portion of the super page of data;
(d) causing to be copied the portion of the super page of data from the first memory block to the second memory block; and
(e) repeating (a)-(d) for each of remaining respective portions of the super page of data.

10. A system, comprising:
memory, the memory comprising:
a first memory block of a first memory density; and
a second memory block of a second memory density which is greater than the first memory density; and
control circuitry, communicatively coupled to the memory, the control circuitry configured to:
determine to transfer data from the first memory block to the second memory block;
generate parity data based on the data;
cause to store the parity data at a parity data address corresponding to an available portion of the first memory block;
cause to update a look-up table with the parity data address; and
cause to copy the data from the first memory block to the second memory block without the parity data.

11. The system of claim 10, wherein to determine to transfer data from the first memory block to the second memory block the control circuitry is to receive a request from a host device to transfer data from the first memory block to the second memory block.

12. The system of claim 10, wherein the memory further comprises a third memory block of a third memory density which is less than the second memory density, wherein the control circuitry is further to:
cause to store the parity data at a parity data address corresponding to an available portion of the third memory block.

13. The system of claim 10, wherein each of the first memory density and the second memory density is any one of: single-level cell (SLC) memory density, multi-level cell (MLC) memory density, tri-level cell (TLC) memory density, quad-level cell (QLC) memory density, penta-level cell (PLC) memory density, or a memory density of greater than 5 bits per memory cell.

14. The system of claim 10, wherein to cause to copy the data from the first memory block to the second memory block, the control circuitry is to:
mark the data stored in the first memory block as invalid; and
mark the parity data stored in the first memory block as invalid.

15. The system of claim 10, wherein to cause to store the parity data at a parity data address corresponding to available portion of the first memory block, the control circuitry is to cause the parity data to be stored at a parity data address which corresponds to: (a) an unallocated portion of memory or (b) invalid data.

16. The system of claim 10, wherein to determine to transfer data from the first memory block to the second memory block the control circuitry is to receive a request to transfer a page of data from the first memory block to the second memory block.

17. The system of claim 10, wherein to determine to transfer data from the first memory block to the second memory block the control circuitry is to receive a request to transfer a super page of data from the first memory block to the second memory block.

18. The system of claim 17, wherein to receive the request to transfer the super page of data from the first memory block to the second memory block the control circuitry is to:
(a) generate parity data corresponding to a portion of the super page of data, based on the portion of the super page of data;
(b) cause to store the parity data at a parity data address corresponding to an available portion of the first memory block;
(c) cause to update a look-up table with the parity data address which corresponds to the portion of the super page of data;
(d) cause to copy the portion of the super page of data from the first memory block to the second memory block; and
(e) repeat (a)-(d) for each of remaining respective portions of the super page of data.

19. A non-transitory computer-readable medium having computer-readable instructions encoded thereon that, when executed by control circuitry, cause the control circuitry to:
determine to transfer data from a first memory block to a second memory block; and
based on the first memory block being of a first memory density and the second memory block being of a second memory density which is greater than the first memory density:
generate parity data based on the data,
cause to store the parity data at a parity data address corresponding to an available portion of the first memory block,
cause to update a look-up table with the parity data address, and
cause to copy the data from the first memory block to the second memory block without the parity data.

* * * * *